(12) United States Patent
Han (10) Patent No.: US 7,731,619 B2
(45) Date of Patent: Jun. 8, 2010

(54) VARIABLE MOTION CONTROL DEVICE AND METHOD OF USE

(75) Inventor: Kyung Soo Han, Timonium, MD (US)

(73) Assignee: Differential Dynamics Corporation, Owing Mills, MD (US)

( * ) Notice: Subject to any disclaimer, the term of this patent is extended or adjusted under 35 U.S.C. 154(b) by 0 days.

(21) Appl. No.: 12/274,784

(22) Filed: Nov. 20, 2008

(65) Prior Publication Data

US 2009/0137359 A1 May 28, 2009

Related U.S. Application Data

(62) Division of application No. 10/933,401, filed on Sep. 3, 2004, now Pat. No. 7,462,124.

(60) Provisional application No. 60/500,704, filed on Sep. 8, 2003.

(51) Int. Cl.
 *F16H 3/58* (2006.01)
(52) U.S. Cl. .................... 475/270; 475/313
(58) Field of Classification Search ............ 475/3, 475/7, 10, 91, 104, 107, 270, 313, 319, 323, 475/900; 74/352
See application file for complete search history.

(56) References Cited

U.S. PATENT DOCUMENTS 2,276,908 A * 3/1942 Schmid ................. 475/104
3,788,167 A * 1/1974 Beaudoin et al. ............ 475/98

* cited by examiner

*Primary Examiner*—Sherry Estremsky
(74) *Attorney, Agent, or Firm*—PCT Law Group, PLLC; Raymond Millien; Thomas H. Jackson (57) ABSTRACT

Variable motion control devices and methods of use. The devices and methods relate to providing an output, such as a rotational shaft output, transmitted from a rotational shaft input, with the output varying based on a control input. The devices and methods are used, for example, to provide a variable output for use with a compressor, power take off, or transmission or differential application. To provide the variable output, the devices and methods include use of mechanical component systems, such as spur gear planetary systems, ring gear planetary systems, bevel gear arrangements, or combinations of such features. The control input is implemented, for example, by arrangements of bindably meshed gears, tension between pulleys joined by belts or similar arrangements of sprockets and chains, use of magnetic clutches, hydraulic or pneumatic controls, or braking devices.

15 Claims, 10 Drawing Sheets

VARIABLE MOTION CONTROL DEVICE AND METHOD OF USE

This application is a divisional of U.S. patent application Ser. No. 10/933,401, filed on Sep. 3, 2004, which is a non-provisional of U.S. Provisional Application No. 60/500,704, filed Sep. 8, 2003. The entirety of each of these non-provisional patent applications is incorporated herein by reference.

BACKGROUND OF THE INVENTION

1. Field of the Invention

The present invention relates to a variable motion control device, and in particular to a variable differential or transmission type device that allows infinitely variable and selectable rotational output at an output shaft, given a fixed or variable input shaft rotation, the variation being controllable via one or more additional inputs.

2. Background of the Technology

There remains an unmet need for providing an easy to use variable rotational shaft output device, given an fixed or variable input shaft rotation, the control occurring via a second input.

SUMMARY OF THE INVENTION

The present invention provides output devices, and methods of use thereof, that each include at least three variable elements: 1) an input; 2) an output; and 3) a control. In one embodiment, the input is a rotational input from, for example, a motor, and the output is a variable rotational output, such as may be used for a compressor, generator, or alternator startup control, power takeoff (PTO), or other device useful in conjunction with or in lieu of a transmission or differential. The control for the input for this embodiment is a variable input, which varies the output from, for example, zero to a maximum. The control can include, for example, a user controlled input or an automatic input (e.g., a feedback control from the output device or an automatic input upon a predetermined condition occurring).

The present invention provides a number of advantages over the prior art, including the following: 1) few parts are used; 2) the device may be constructed to be quite compact; 3) the device is typically inexpensive to build, relative to comparable known devices; 4) due to the presence of minimal wearing parts, maintenance is minimal; 5) for most embodiments, the device requires no "free-wheeling" or one-way clutch features (e.g., sprag clutches), as with some variable control devices of the prior art; 6) the device produces no "ripples" in input or output, as operation is smoothly implementable; and 7) virtually unlimited input to output multiplication is possible.

The present invention has a number of applications, such as the following: 1) to control compressor operation so as to increase efficiency and minimize problems with compressor startup; 2) to control generator and alternator operation so as to increase efficiency and minimize problems with compressor startup; and 3) to provide improved variable control and operation of vehicles or other devices (e.g., for transmission or differential applications).

The functionality of the present invention may be accomplished via a number of mechanisms or systems. In some implementations, spur gear planetary systems are used with all spur gears having a single or similar diameters. In other implementations, spur gear planetary systems are used, with one or more spur gears having multiple diameters. In other implementations, ring gear planetary systems are used. In yet other implementations, bevel gear arrangements are used. Combinations of such arrangements are also provided.

The control input may be implemented via a number of mechanisms, such as the following: 1) application of a binding force between two meshed gears to allow, prevent, or retard motion therebetween; 2) use of belts and pulleys, for example, in which the distances between the centers of the pulleys is used to control the tension between the pulleys and therefore to allow, prevent, or retard motion therebetween; 3) use of chains and sprockets operated similarly to belts and pulleys; 4) operation of magnetic and/or electro-magnetic clutches; 5) use of hydraulic controls; 6) application of pneumatic controls; and 7) use of brakes.

Additional controls other than the single input may also be added to the system to further increase application and flexibility. For example, in one embodiment, an output control is added to control output speed further. In another embodiment, forward and reverse controls are added.

Additional advantages and novel features of the invention will be partially set forth in the description that follows, and will also become apparent to those skilled in the art upon examination of the following or upon learning by practice of the invention.

DETAILED DESCRIPTION OF THE INVENTION

The present invention provides variable motion control devices and methods of use. The devices and methods generally relate to providing an output, such as a rotational shaft output, transmitted from a rotational shaft input, with the output varying based on a control input. The devices and methods are used, for example, to provide a variable output for use with a compressor, power take off, or transmission or differential application. To provide the variable output, the devices and methods include use of mechanical component systems, such as spur gear planetary systems, ring gear planetary systems, bevel gear arrangements, or combinations of such features. The control input is implemented, for example, by arrangements of bindably meshed gears, tension between pulleys joined by belts or similar arrangements of sprockets and chains, use of magnetic and/or electro-magnetic clutches, hydraulic or pneumatic controls, or braking devices.

The control may also be linked to operation of the output. For example, a speed sensor for an input may be operationally linked to the control for the device, such that variations in input speed are offset by control variation, such that output remains constant, or such that high changes in input speed are initially offset and then gradually implemented to the output (e.g., for compressor kick-in applications).

Various implementations of the present invention will now be described.

First Implementation

Figure 1:
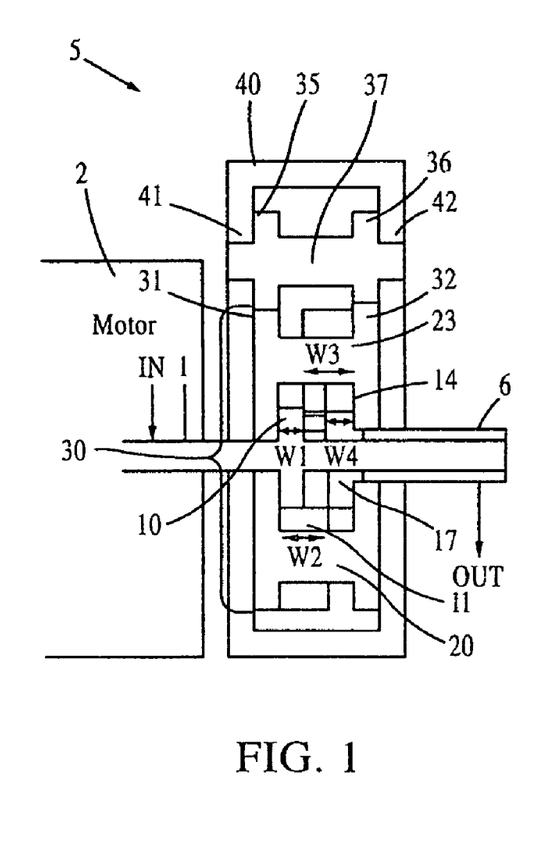
FIG. 1 shows a cross-sectional view of a first implementation of the variable differential device of present invention using a planetary gear type arrangement with gears each having a single diameter.
Figure 2:
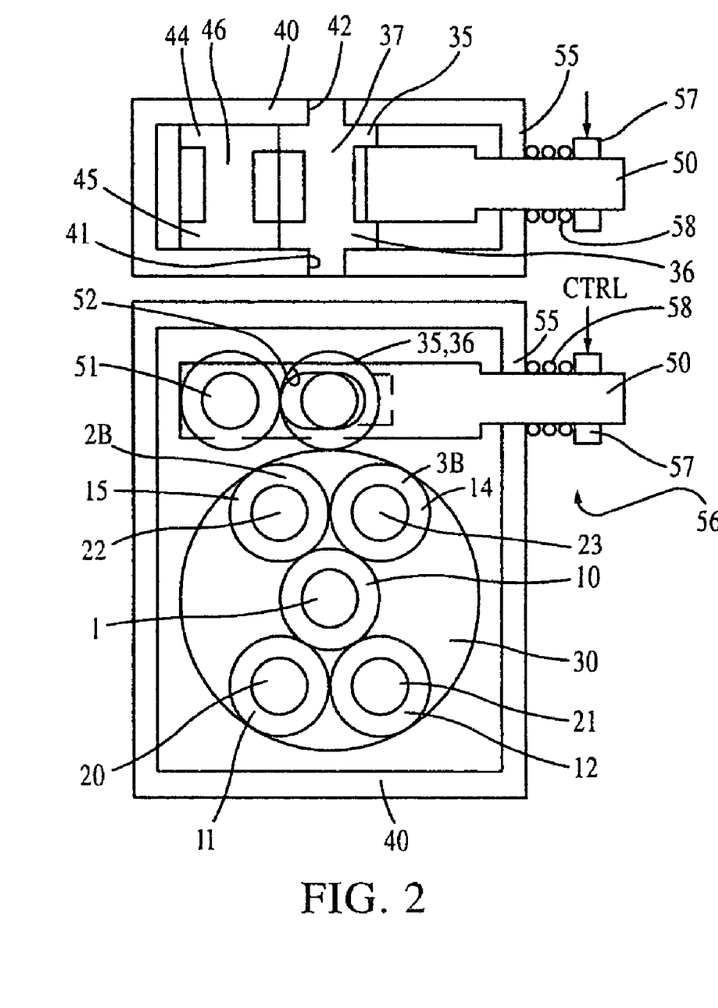
FIG. 2 presents end cutaway views of the variable differential device of FIG. 1.

FIG. 1 shows a cross-sectional view of a first implementation of a variable motion control device, in accordance with an embodiment of the present invention, using a planetary gear type arrangement, in which spur gears of two width sizes are used. FIG. 2 shows end cutaway views of the variable differential device of FIG. 1. As shown in FIGS. 1 and 2, an input shaft 1 extends from a motor 2 through a variable differential device body 5 into an output sleeve shaft 6. The input shaft 1 includes extending first input shaft gear 10 having first gear exterior teeth and width $w_1$. First gear 10 meshably engages second gear 11 having second gear exterior teeth. As further shown in FIGS. 1 and 2, second planetary gear 11 has gear width $w_2$, allowing second gear 11 to engage both first gear 10 and third planetary gear 12, having width $w_3$. Similarly, in one embodiment, fourth planetary gear 14 having width $w_2$ and fifth planetary gear 15 having width $w_3$ meshably engage via external teeth, with fourth gear 14 engaging first gear 10 via external teeth.

Third gear 12 and fifth gear 15 engage sixth gear 17 fixably attached to output sleeve shaft 6.

Second gear 11 slidably revolves about axle 20, third gear 12 slidably revolves about axle 21, fourth gear 14 slidably revolves about axle 23, and fifth gear 15 slidably revolves about axle 22. Axles 20, 21, 22, and 23 are mounted to drum gear 30 having fixably attached external teeth gear portions 31, 32, thereby coupling second gear 11, third gear 12, fourth gear 14, and fifth gear 15 to drum gear 30. External teeth gear portions 31, 32 of drum gear 30 engage teeth of gear portions 35, 36, respectively, fixably mounted on axle 37. Axle 37 in turn slidably revolves within outer housing 40 via axle retaining portions 41, 42. External teeth gear portions 44, 45 fixably attached to axle 46 engage external teeth 35, 36, respectively, mounted on axle 37.

Axle 46 slidably revolves within circular opening 51 of control rod 50. Axle 37 slidably revolves within oblong opening 52 of control rod 50. Control rod 50 is slidably mounted to housing 40 via opening 55. Tension is variably applicable to engagement between external teeth gear portions 35, 36 mounted on axle 37 and external teeth gear portions 44, 45 mounted on axle 46 via tensioning features 56. In one embodiment, tensioning features include a tension adjustment portion 57, such as a threaded member (e.g., bolt) having inner threads matable with external threads on control rod 50, and a biasing portion 58, such as a spring biased to an expanded configuration, tensionally opposing travel of the tension adjustment portion in a first direction (e.g., opposing travel of tension adjustment portion 57 toward housing 40). Travel of the tension adjustment portion 57 in conjunction with opposing bias of biasing portion 58 thereby apply variable tension to geared interface of external teeth gear portions 35, 36 mounted on axle 37 and external teeth gear portions 44, 45 mounted on axle 46 (such tension affecting gear interface interchangeably referred to herein as "an arresting force").

In operation, motor 2 produces revolution of shaft 1, in turn revolving first gear 10. First gear 10 in turn engages second gear 11 and fourth gear 14, second gear 11 and fourth gear 14 in turn engaging third gear 12 and fifth gear 15, respectively. Third gear 12 and fifth gear 15 in turn engage sixth gear 17.

Output of sleeve shaft 6 via sixth gear 17 varies depending on rotational motion of drum gear 30. In a first operational mode, minimal tensional engagement is made between external teeth gear portions 35, 36 mounted on axle 37 and external teeth gear portions 44, 45 mounted on axle 46. As a result, in the first operational mode, drum gear 30 freely rotates, allowing engaged second gear 11, third gear 12, fourth gear 14, and fifth gear 15 to revolve about first gear 10 and hence about sixth gear 17, producing minimal output at sleeve shaft 6.

In a second operational mode, high tensional engagement is made between external teeth gear portions 35, 36 mounted on axle 37 and external teeth gear portions 44, 45 mounted on axle 46. As a result, in the second operational mode, interference between external teeth gear portions 35, 36 mounted on axle 37 and external teeth gear portions 44, 45 mounted on axle 46 prevents rotation of axle 37 and hence external teeth gear portions 35, 36 mounted on axle 37. Held external teeth gear portions 35, 36 mounted on axle 37 in turn hold drum gear 30, preventing rotation thereof. Second gear 11, third gear 12, fourth gear 14, and fifth gear 15 are prevented from revolving about first gear 10. Rotation without revolution of second gear 11, third gear 12, fourth gear 14, and fifth gear 15 engaged with sixth gear 17 producing maximum rotation of sixth gear 17 and hence maximum output at sleeve shaft 6.

In a third operational mode, partial tensional engagement is made between external teeth gear portions 35, 36 mounted on axle 37 and external teeth gear portions 44, 45 mounted on axle 46. As a result, in the third operational mode, a partial interference between external teeth gear portions 35, 36 mounted on axle 37 and external teeth gear portions 44, 45 mounted on axle 46 retards rotation of axle 37 and hence retards rotation of external teeth gear portions 35, 36 mounted on axle 37. Retarded rotational motion of external teeth gear portions 35, 36 mounted on axle 37 in turn retard rotational motion of drum gear 30. Second gear 11, third gear 12, fourth gear 14, and fifth gear 15 are thereby retarded in revolution about first gear 10. Retarded revolution of second gear 11, third gear 12, fourth gear 14, and fifth gear 15 engaged with sixth gear 17 produces a retarded rotation of sixth gear 17 and hence output at sleeve shaft 6 that varies with retardation of revolution of drum gear 30.

Second Implementation

Figure 3:
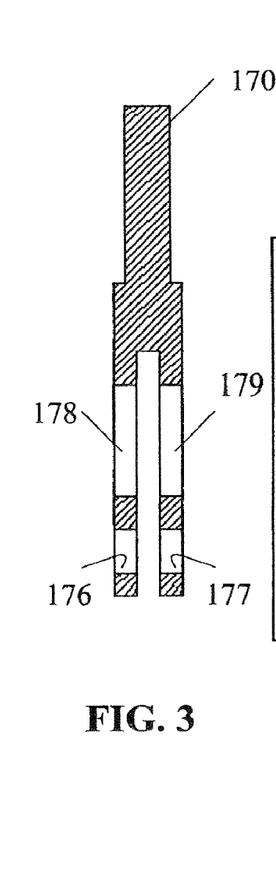
FIG. 3 is a side view of a control rod for use with a second implementation of the present invention.
Figure 4:
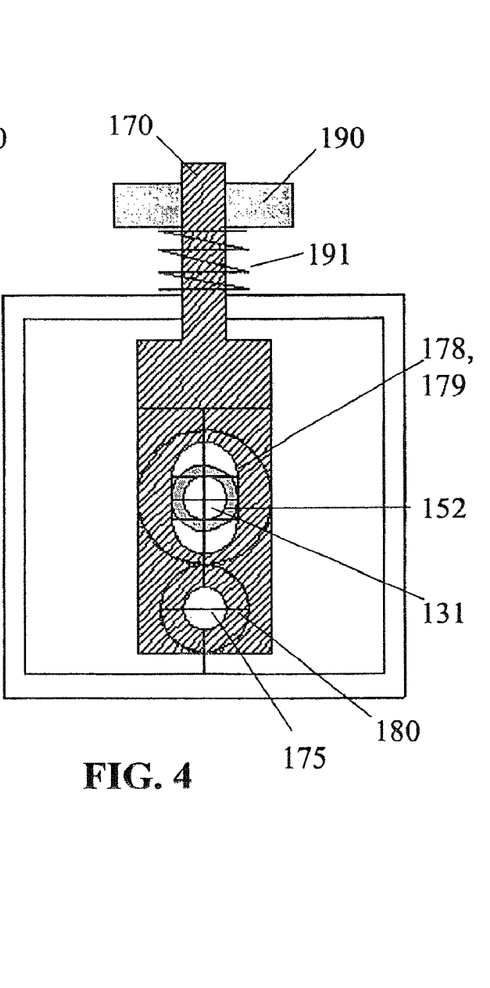
FIG. 4 contains an end cutaway view of the second implementation of the present invention.
Figure 5:
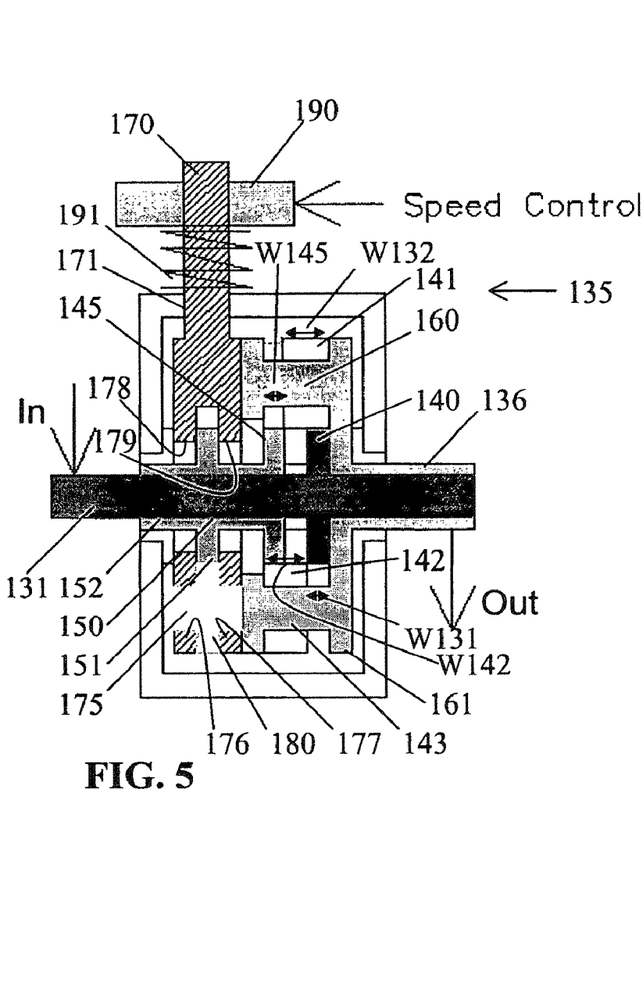
FIG. 5 shows a side cross-sectional view of the second implementation of the present invention.

FIGS. 3-5 show a cross-sectional view of a second implementation of the infinitely variable motion control device of present invention using a planetary gear type arrangement, in which spur gears of a single diameter are used. As shown in FIGS. 3-5, an input shaft 131 extends from a motor (not shown) through a variable differential device body 135 into an output sleeve shaft 136. The input shaft 131 includes extending first gear 140 having first gear exterior teeth and width $W_{131}$. First gear 140 meshably engages second gear 141 having second gear exterior teeth. Second gear 141 is mounted on axle 160. As further shown in FIG. 5, second gear 141 has gear width $w_{132}$, allowing second gear 141 to engage both first gear 140 and third gear 142, having width $w_{142}$. Third gear 142 is mounted on axle 143, and axles 160 and 143 are positioned such external teeth of second gear 141 continually engage external teeth of third gear 142. Axles 143 and 160 are each mounted to hub 161, which in turn is attached to output sleeve shaft 136, such that the second gear 141 and third gear 142 are coupled to the sleeve shaft 136. Similarly to the second pair of gears 14 and 15, as shown in embodiment of FIGS. 1 and 2, in one embodiment of the second implementation, a second corresponding pair of gears to the second gear 141 and third gear 142 mounted on a second pair of axles are optionally used.

Sleeve unit 150 includes fourth extending gear 145 having external teeth that engage external teeth of third gear 142. In addition, sleeve unit 150 includes fifth extending gear 151 having exterior teeth. Sixth gear 180 is mounted to axle 175. Axle 175 slidably revolves within circular openings 176, 177 of control rod 170. Input shaft 131 and sleeve shaft 152 of sleeve unit 150 slidably revolve within oblong openings 178, 179 of control rod 170. Control rod 170 is slidably mounted to housing 135 via opening 171. Tension is variably applicable to engagement between external teeth of fifth gear 151 and external teeth of sixth gear 180. In one embodiment, tensioning features include a tension adjustment portion 190, such as a threaded member (e.g., bolt) having inner threads matable with external threads on control rod 170, and a biasing portion 191, such as a spring biased to an expanded configuration, tensionally opposing travel of the tension adjustment portion in a first direction (e.g., opposing travel of tension adjustment portion 190 toward housing 135). Travel of the tension adjustment portion 190 in conjunction with opposing bias of biasing portion 191 thereby apply variable tension to geared interface of external teeth of fifth gear 151 and external teeth of sixth gear 180 mounted on axle 175.

In operation, the motor produces revolution of shaft 131, in turn revolving first gear 140. First gear 140 in turn engages second gear 141, second gear 141 in turn engaging third gear 142. Third gear 142 in turn engages fourth gear 145.

Output of sleeve shaft 136 varies depending on rotational motion of hub 161. In a first operational mode, minimal tensional engagement is made between external teeth of fifth gear 151 and sixth gear 180. As a result, in the first operational mode, sleeve unit 150 and attached fourth gear 145 freely rotate, allowing engaged third gear 142 to rotate about axle 143, and second gear 141 to likewise rotate about axle 160, with no resulting rotation of hub 161 or attached output sleeve shaft 136.

In a second operational mode, high tensional engagement is made between external teeth gear of fifth gear 151 and sixth gear 180. As a result, in the second operational mode, interference between external teeth of fifth gear 151 and sixth gear 180 prevents rotation of sleeve unit 150 and hence fourth gear 145 is prevented from rotating. Held fourth gear 145 in turn produces revolution of third gear 142 on axle 160 about fourth gear 145. Revolution of third gear 142 about fourth gear 145 produces rotation of hub 161 and hence rotation of attached output sleeve shaft 136.

In a third operational mode, partial tensional engagement is made between external teeth of fifth gear 151 and sixth gear 180. As a result, in the third operational mode, a partial interference between external teeth of fifth gear 151 and sixth gear 180 retards rotation of sleeve unit 150, and hence retards rotation of fourth gear 145. Retarded rotation of fourth gear 145 produces retarded revolution of third gear 142 on axle 143 about fourth gear 145, in turn producing retarded rotation of hub 161 and hence attached sleeve output shaft 136.

Third Implementation

Figure 6:
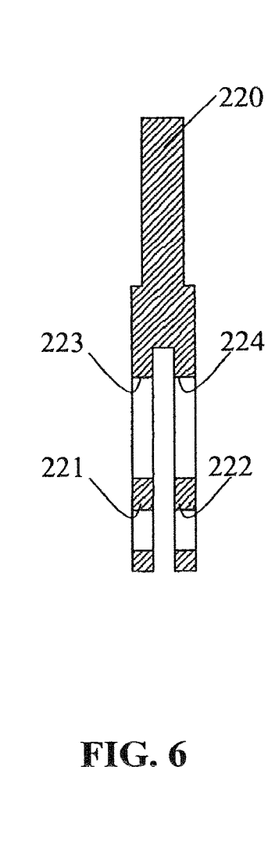
FIG. 6 presents a side view of two control rods for use with a third implementation of the present invention.
Figure 7:
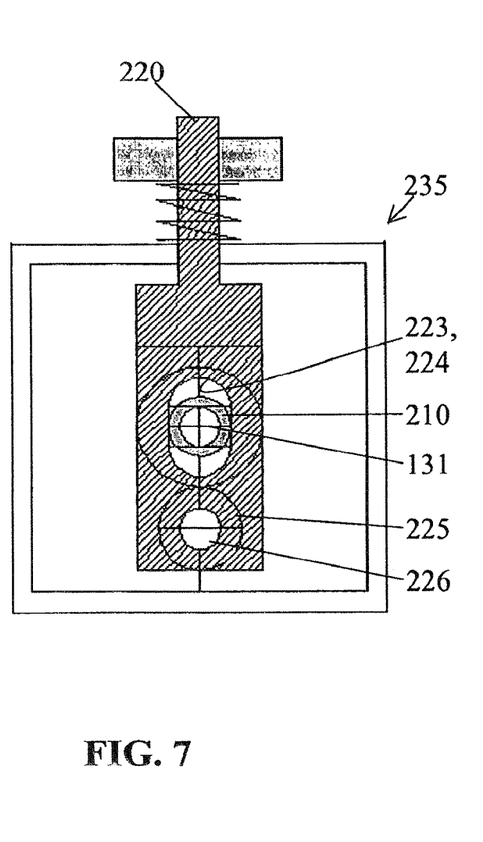
FIG. 7 contains an end cutaway view of the third implementation of the present invention.
Figure 8:
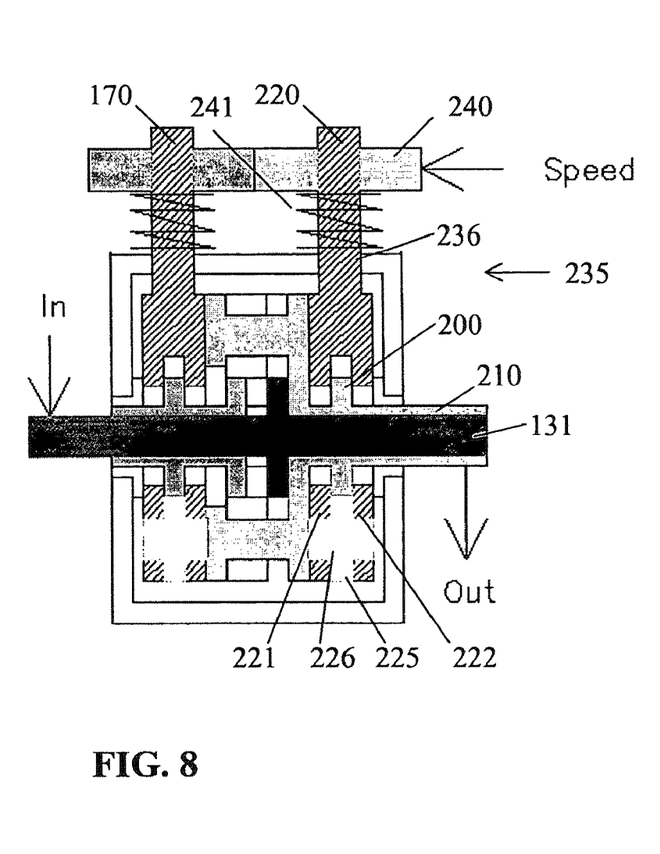
FIG. 8 shows a side cross-sectional view of the third implementation of the present invention.

FIGS. 6-8 shows a cross-sectional view of a third implementation of the infinitely variable motion control device of present invention using a planetary gear type arrangement, in which spur gears of a single diameter are used, the third implementation further including a speed control input. Each of the features of the device of FIGS. 6-8 are similar in design and function to the corresponding features of the second implementation, shown in FIGS. 3-5, except for the addition of an output sleeve shaft gear, seventh gear 200 having external teeth, the gear 200 extending from the output sleeve shaft 210, the inclusion of a second control rod 220 with similar features and function to the first control rod 170, as shown and described in conjunction with FIGS. 3-5, and the increased size of the variable differential device body 235 so as to accommodate the speed control elements. Other than inclusion of the seventh gear 200, output sleeve shaft 210 is similar in design and function to the output sleeve shaft 136 shown in FIG. 5.

As shown in FIGS. 6-8, eighth gear 225 is mounted to axle 226. Axle 226 slidably revolves within circular openings 221, 222 of control rod 220. External shaft 210 slidably revolves within oblong openings 223, 224 of control rod 220. Control rod 220 is slidably mounted to housing 235 via opening 236. Tension is variably applicable to engagement between external teeth of seventh gear 200 and external teeth of eighth gear 225. In one embodiment, tensioning features include a tension adjustment portion 240, such as a threaded member (e.g., bolt) having inner threads matable with external threads on control rod 220, and a biasing portion 241, such as a spring biased to an expanded configuration, tensionally opposing travel of the tension adjustment portion in a first direction (e.g., opposing travel of tension adjustment portion 240 toward housing 235). Travel of the tension adjustment portion 240 in conjunction with opposing bias of biasing portion 241 thereby apply variable tension to geared interface of external teeth of seventh gear 200 and external teeth of eighth gear 225 mounted on axle 226. In one embodiment, control gears 190 and 240 adjust tension inversely.

Thus, so long as first control rod 170 is not tensioned so as to prevent any retardation of the output sleeve shaft 210 (in which position a bind would occur), the second control rod 220 may be tensionably used to control further the rotational speed of the output sleeve shaft 210.

Fourth Implementation

Figure 9:
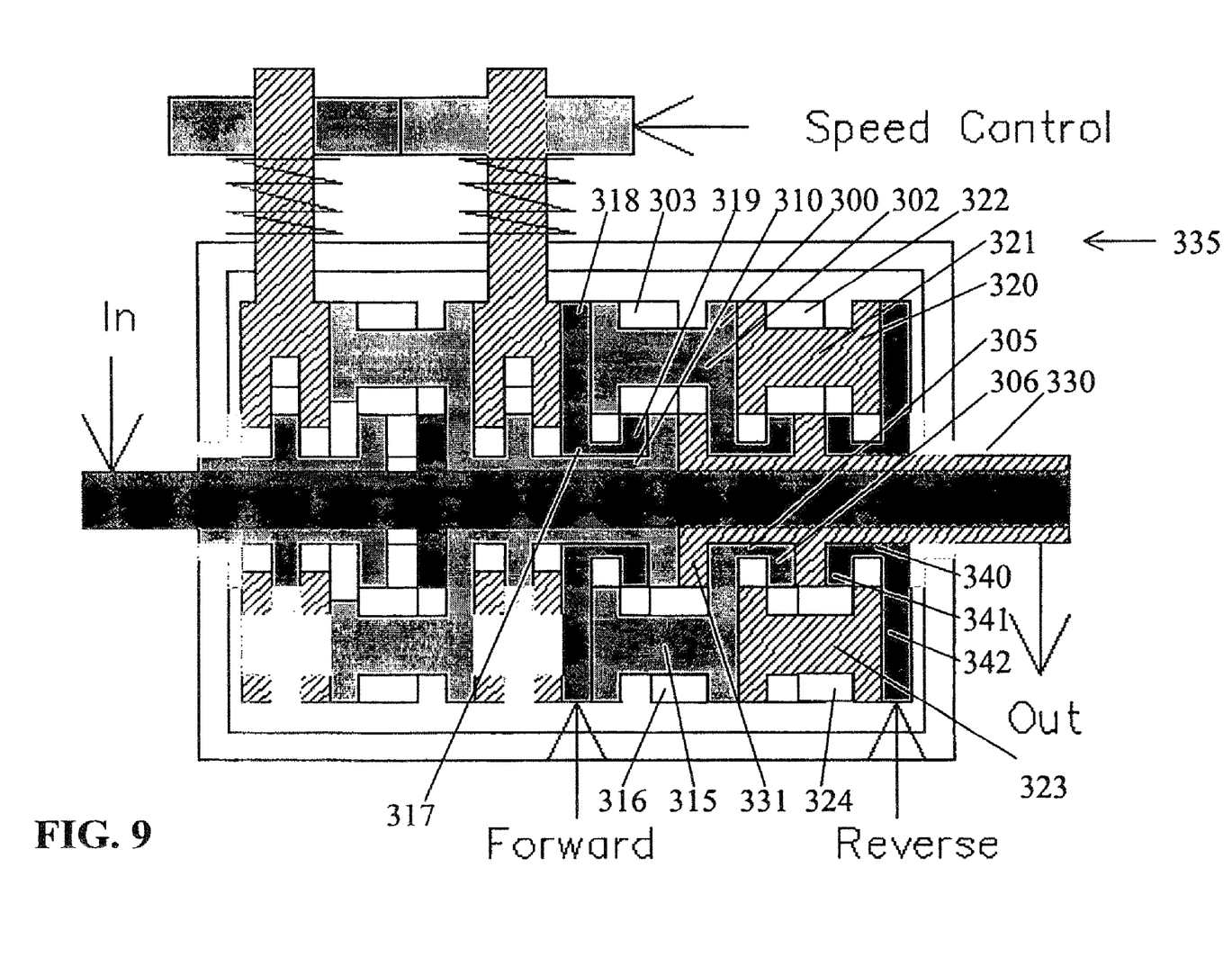
FIG. 9 presents a side cross-sectional view of a fourth implementation of the present invention.
Figure 10:
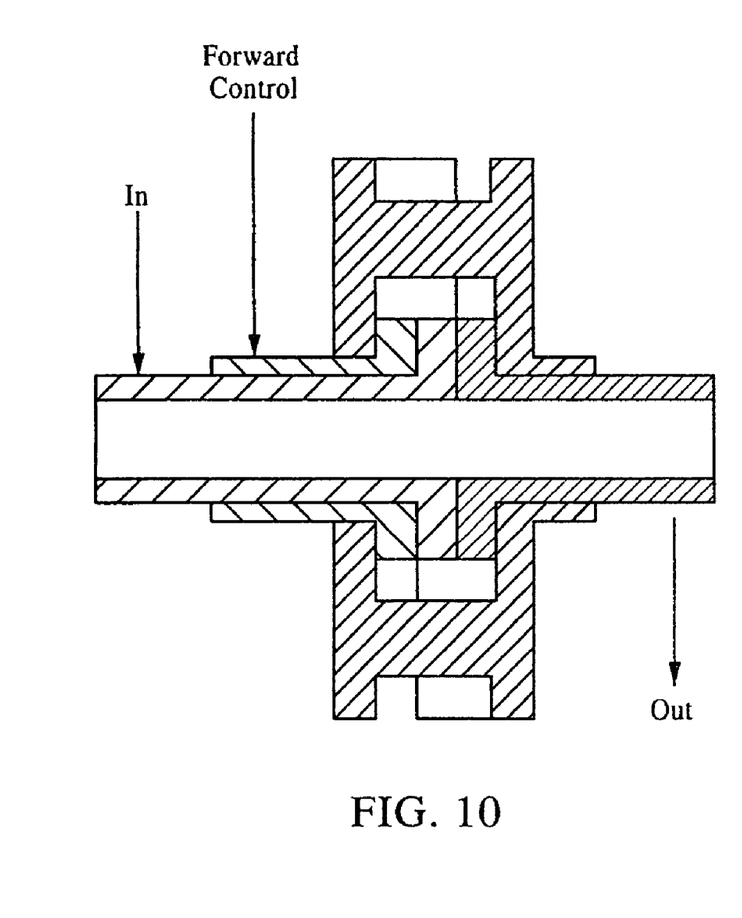
FIG. 10 is a representative diagram of the forward control feature of the implementation of FIG. 9.
Figure 11:
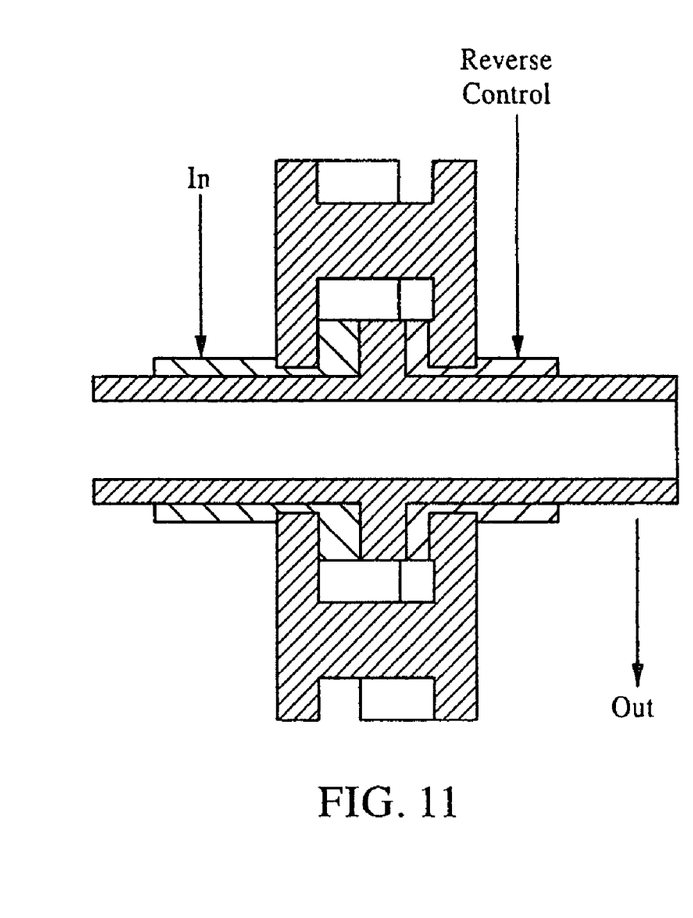
FIG. 11 contains a representative diagram of the reverse control feature of the implementation of FIG. 9.

FIG. 9, along with the closeup representations of FIGS. 10 and 11, show a cross-sectional view of yet a fourth implementation of the infinitely variable motion control device of the present invention using a planetary gear type arrangement, in which spur gears of a single diameter are used, the fourth implementation including both the speed control input and other features of FIGS. 6-8, and features for allowing reversal of direction of the output rotation. Each of the features of the device of FIG. 9 is similar in design and function to the corresponding features of the third implementation, shown in FIGS. 6-8, except for the addition of a second hub (also referred to interchangeably herein as a second "drum gear") 300 (and associated features) attached to a first output sleeve shaft 310 for controlling forward motion, addition of a third hub 320 (and associated features) attached to a second output sleeve shaft 330, and the increased size of the variable differential device body 335 so as to accommodate both the speed control elements and the direction reversing elements. Other than inclusion of the attached second hub 300, output sleeve shaft 310 is similar in design and function to the output sleeve shaft 210 shown in FIG. 8. In addition, other features are provided for controlling the forward and reverse directions of the output rotation.

As shown in FIG. 9, the first output sleeve shaft 310 has the attached second hub 300, the second hub 300 rotating with rotation of the sleeve shaft 310. The second hub 300 includes axle 302 about which rotates second hub first gear, ninth gear 303 having external teeth, and axle 315, about which rotates second hub second gear, tenth gear 316 having external teeth. The external teeth of ninth gear 303 meshably engage external teeth of tenth gear 316. Ninth gear 303 and tenth gear 316 are thereby coupled to second hub 300. In one embodiment, a corresponding second pair of gears meshably engage from a second pair of axles of second hub 300, similarly to as described with regard to drum gear 30 of FIGS. 1 and 2. Also extending from sleeve portion 305 of second hub 300 is eleventh gear 306 having external teeth.

A forward control sleeve shaft 317 sleeves the first output sleeve shaft 310. Forward control sleeve shaft 317 has control feature 318 for preventing sleeve shaft rotation, such as via a control mechanism, such as a control rod and meshing gears, similar to control rod 50 and meshing gears 35, 36 and 44, 45, as described with regard to FIGS. 1 and 2. Alternatively, for example, a clutch or brake device, as known in the art, may be used to arrest motion of forward control sleeve shaft 317. Control sleeve gear, twelfth gear 319, having external teeth, extends from forward control sleeve shaft 317. External teeth of twelfth gear 319 meshably engage external teeth of ninth gear 303. External teeth of tenth gear 316 also engage external teeth of second output sleeve shaft gear, thirteenth gear 331, extending from second output sleeve shaft 330. Second output sleeve shaft 330 also has attached third hub 320, which rotates with second output sleeve shaft 330. The third hub 320 includes axle 321 about which rotates third hub first gear, fourteenth gear 322, having external teeth, and axle 323, about which rotates third hub second gear, fifteenth gear 324, having external teeth. The external teeth of fourteenth gear 322 meshably engage external teeth of fifteenth gear 324. In one embodiment, a corresponding second pair of gears meshably engage from a second pair of axles of second hub 300, similarly to as described with regard to drum gear 30 of FIGS. 1 and 2.

A reverse control sleeve shaft 340 sleeves the second output sleeve shaft 330. Reverse control sleeve shaft 340 has control feature 342 for preventing sleeve shaft rotation, such as a control rod and meshing gears, similar to control rod 50 and meshing gears 35, 36 and 44, 45, as described with regard to FIGS. 1 and 2. Alternatively, for example, a clutch or brake device, as known in the art, may be used to arrest motion of reverse control sleeve shaft 340. Reverse control sleeve shaft gear, Sixteenth gear 341, having external teeth extends from reverse control sleeve shaft 306. External teeth of sixteenth gear 341 meshably engage external teeth of fifteenth gear 324.

In first operational mode, the forward control sleeve shaft 317, and hence, attached twelfth gear 319 are prevented from rotation via control feature 318, and rotational output of first output shaft 310 (in first rotational direction) produces rotation of second hub 300 (in first rotational direction). In the first operational mode, rotation of reverse control sleeve shaft 340 is not impeded. Rotation of second hub 300 (in first rotational direction) produces rotation of ninth gear 303 (in first rotational direction) in revolution about twelfth gear 319. Rotation of ninth gear 303 (in first rotational direction) produces rotation of tenth gear 316 (in second, opposite rotational direction to first rotational direction). Rotation of tenth gear 316 (in second rotational direction) in turn produces rotation of thirteenth gear 331 (in first rotational direction), and hence rotation of second output shaft 330 (in first rotational direction).

In second operational mode the reverse control sleeve shaft 340, and hence, attached sixteenth gear 341 are prevented from rotation via control feature 342. Rotational output of first output shaft 310 (in first rotational direction) produces rotation of second hub 300 (in first rotational direction). In the second operational mode, rotation of forward control sleeve shaft 317 is not impeded. Rotation of second hub 300 (in first rotational direction) produces rotation of fourteenth gear 322 (in second, opposite rotational direction to first rotational direction). Rotation of fourteenth gear 322 (in second rotational direction) produces rotation of fifteenth gear 324 (in first rotational direction). Rotation of fifteenth gear 324 (in first rotational direction) results in revolution of fifteenth gear 323 about sixteenth gear 341 (in second rotational direction), in turn producing rotation of third hub 320 (in second rotational direction), and hence rotation of second output shaft 330 (in second, reversed rotational direction).

FIGS. 10 and 11 show representative operation of the embodiment of FIG. 9. In FIG. 10, input (via first output sleeve 310 shown in FIG. 9) and use of forward control (via forward control feature 318 of FIG. 9) produces forward output. In FIG. 11, input (via sleeve 305 shown in FIG. 9) and use of reverse control (control feature 342 of FIG. 9) produces reverse output.

While the present invention in the above example implementations have each been described in conjunction with a first arrangement of planetary spur gears, the spur gears being each of single diameter, a differing arrangement of planetary spur gears with some of the spur gears having multiple diameter portions may also be used. Further, a corresponding arrangement of planetary ring gears, or bevel gears may likewise be used to accomplish the same relative motion between an input and an output sleeve shaft.

In addition, output directional control and other control may be accomplished by other components and methods than application of a binding force between two meshed gears to allow, prevent, or retard motion therebetween (i.e., apply an arresting force), as previously described. For example, such components and methods may include one or more of the following: 1) use of belts and pulleys, for example, in which the distances between the centers of the pulleys is used to control the tension between the pulleys and therefore to allow, prevent, or retard motion therebetween; 2) use of chains and sprockets operated similarly to belts and pulleys; 3) operation of magnetic clutches; 4) use of hydraulic controls; 5) application of pneumatic controls; and 6) use of brakes.

Additional variations of the present invention will now be described.

Second Variation of First Implementation

Figure 12:
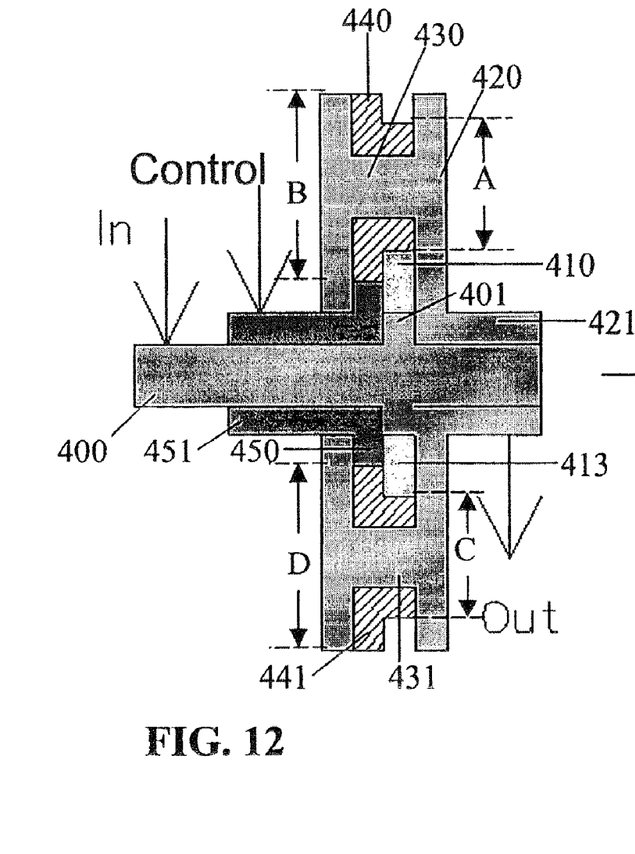
FIG. 12 shows a side cross-sectional view of a second variation of the first implementation of the present invention.
Figure 13:
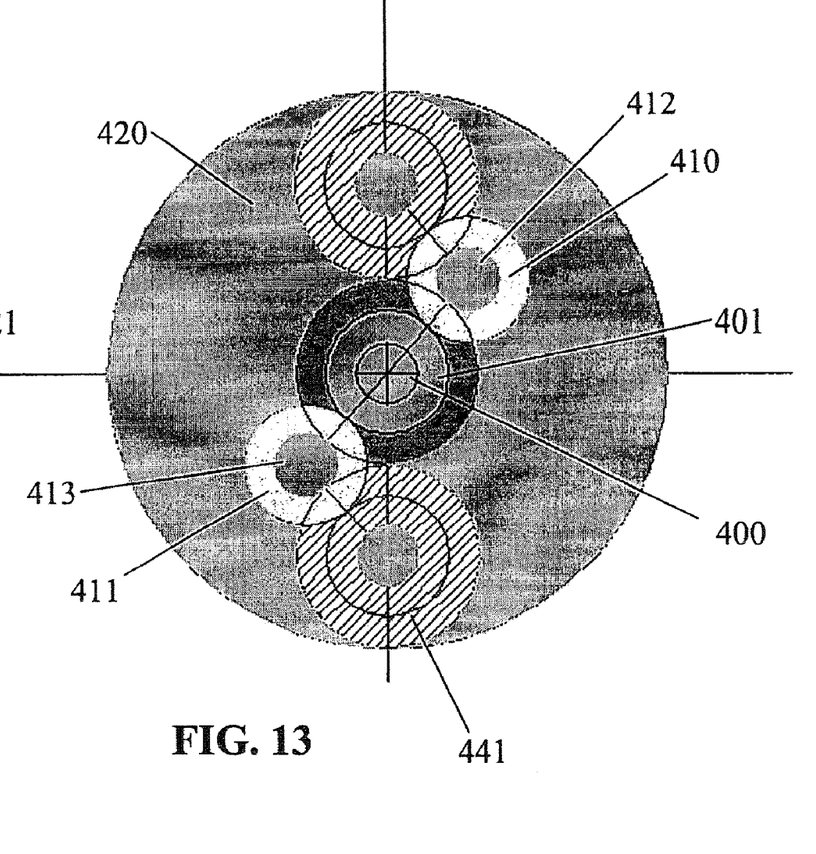
FIG. 13 presents a cutaway end view of the variation of FIG. 12.

FIGS. 12 and 13 show the present invention implemented with a second arrangement of planetary spur gears, with some of the spur gears having two differing diameter portions. As shown in FIGS. 12 and 13, an input shaft 400 extending from, for example, a motor, has an attached first gear 401 having external teeth, the gear 401 being of a single diameter. Second gear 410 and third gear 411, each having external teeth and being of a single diameter, revolve about shafts 412, 413, respectively, which extend from drum portion 420. Drum portion 420 has attached output sleeve shaft 421.

Drum portion 420 further includes first axle 430 and second axle 431, about which turn a fourth gear 440 and a fifth gear 441. The fourth gear 440 has two portions of differing diameters A and B, each of the differing diameter portions having external teeth. Similarly, the fifth gear 441 has two portions of differing diameters C and D, with each of the differing diameter portions having external teeth. The external teeth of the portion of the fourth gear 440 having the first diameter A engage the external teeth of the second gear 410. The external teeth of the portion of the fifth gear 441 having the first diameter C engage the external teeth of the third gear 413.

The external teeth of the portion of the fourth gear 440 having the second diameter B and the external teeth of the portion of the fifth gear 441 having the second diameter C each engage the external teeth of a control sleeve gear, sixth gear 450. The sixth gear 450 is attached to a control sleeve shaft 451. Rotation of the sixth gear may be controlled, for example, via a seventh gear attached to the control sleeve shaft 451 using a control rod and eighth gear, similarly to as described with regard to FIGS. 3-5.

In operation, rotation of input shaft 400 produces rotation of second gear 410 and third gear 413 via first gear 401. Second gear 410 produces rotation of fourth gear 440, and third gear 413 produces rotation of fifth gear 441. If sixth gear 450 is free to rotate, fourth gear 440 and fifth gear 441 cause rotation of sixth gear 450 and sleeve shaft 451, with no rotational motion transferred to output sleeve shaft 421. If sleeve shaft 451 is held, preventing rotational motion of sixth gear 450, rotation of fourth gear 440 and fifth gear 441 produce rotation of drum portion 420, and hence rotational motion of output sleeve shaft 421. If sleeve shaft 451 is retarded in rotational motion, retarded rotation of fourth gear 440 and fifth gear 441 is produced, resulting in retarded rotation of drum portion 420, and hence retarded rotational motion of output sleeve shaft 421.

Third Variation of First Implementation

Figure 14:
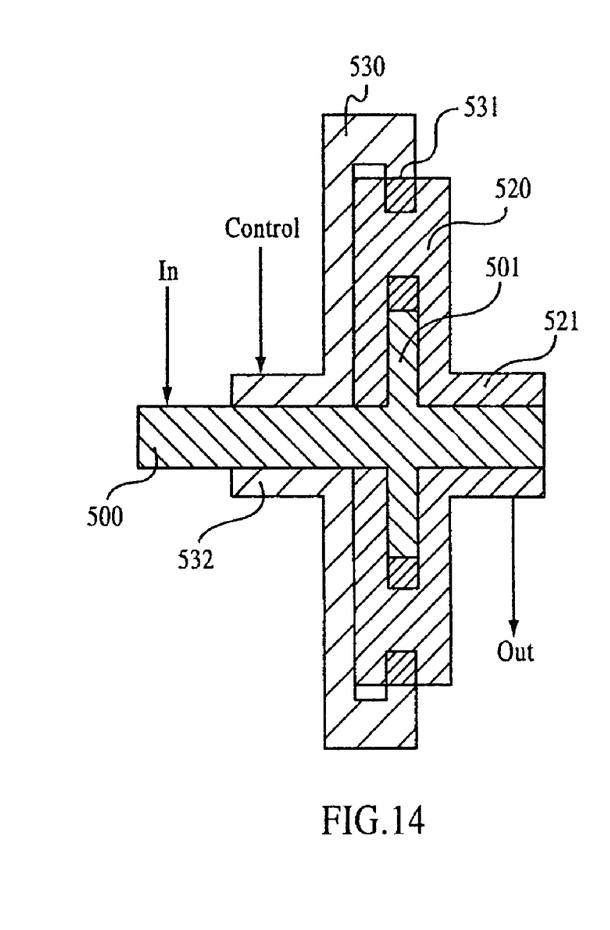
FIG. 14 shows a side cross-sectional view of a third variation of the first implementation of the present invention.
Figure 15:
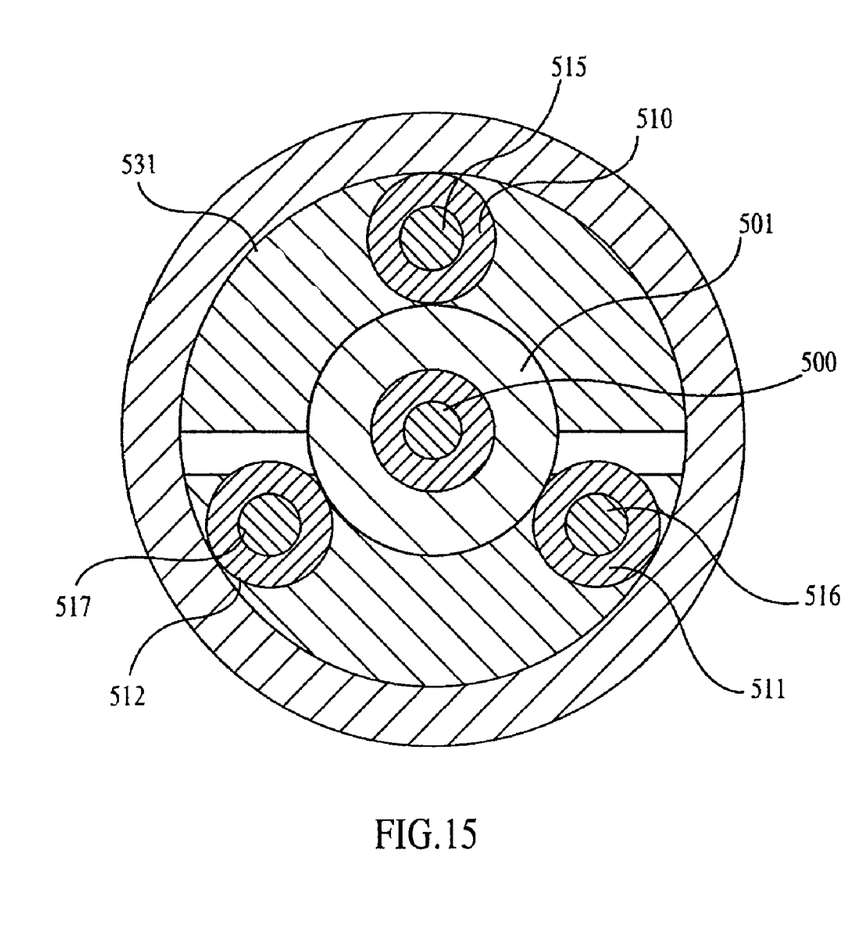
FIG. 15 presents a cutaway end view of the variation of FIG. 14.

FIGS. 14 and 15 show implementation of the present invention via an arrangement of planetary ring gears. As shown in FIGS. 14 and 15, an input shaft 500 extending from, for example, a motor, has an attached first gear 501 having external teeth. Second gear 510, third gear 511, and fourth gear 512, each having external teeth, revolve about axles 515, 516, and 517, respectively. Axles 515, 516, and 517 are held by drum portion 520, which has attached output sleeve shaft 521.

Control ring gear portion 530 includes teeth on internal surface 531 that engage external teeth of second gear 510, third gear 511, and fourth gear 512. Control ring gear portion 530 further includes attached control sleeve shaft 532. Rotation of the control ring gear portion 530 may be controlled, for example, via a fifth gear attached to the control sleeve shaft 532 using a control rod and sixth gear, similarly to as described with regard to FIGS. 3-5.

In operation, rotation of input shaft 500 produces rotation of second gear 510, third gear 511, and fourth gear 512 via first gear 501. If control ring gear portion 530 is free to rotate, second gear 510, third gear 511, and fourth gear 512 cause rotation of control ring gear portion 530 and sleeve shaft 532, with no rotational motion transferred to output sleeve shaft 521. If sleeve shaft 532 is held, preventing rotational motion of control ring gear portion 530, rotation of second gear 510, third gear 511, and fourth gear 512 produce rotation of drum portion 520, and hence rotational motion of output sleeve shaft 521. If sleeve shaft 532 is retarded in rotational motion, retarded rotation of second gear 510, third gear 511, and fourth gear 512 is produced, resulting in retarded rotation of drum portion 520, and hence retarded rotational motion of output sleeve shaft 521.

Fourth Variation of First Implementation

Figure 16:
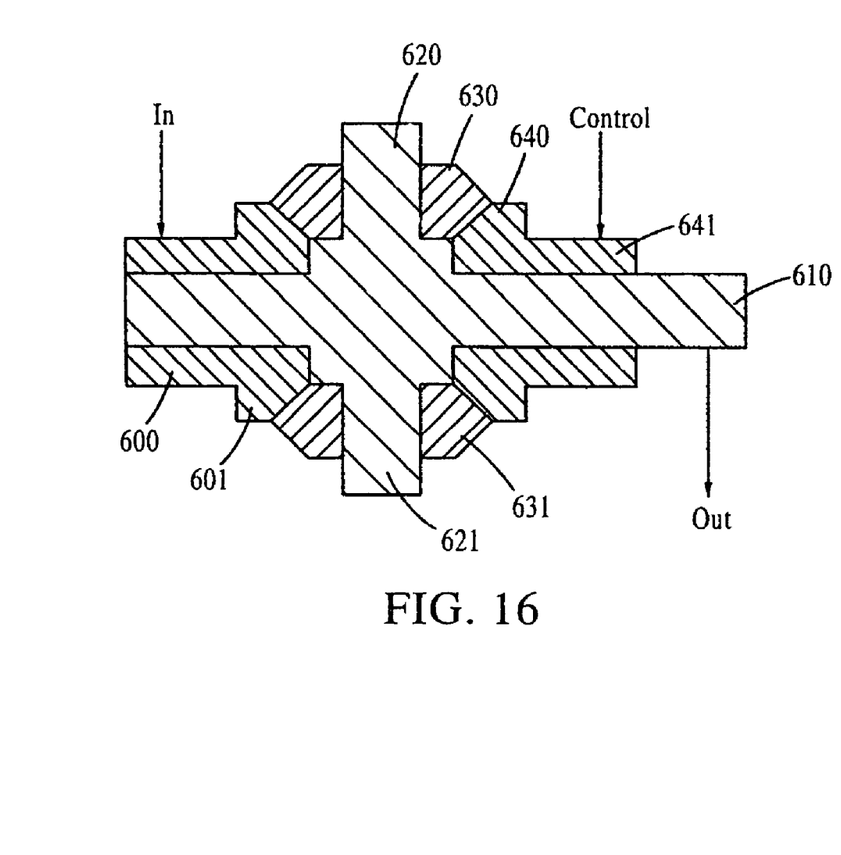
FIG. 16 shows a side cross-sectional view of a fourth variation of the first implementation of the present invention.
Figure 17:
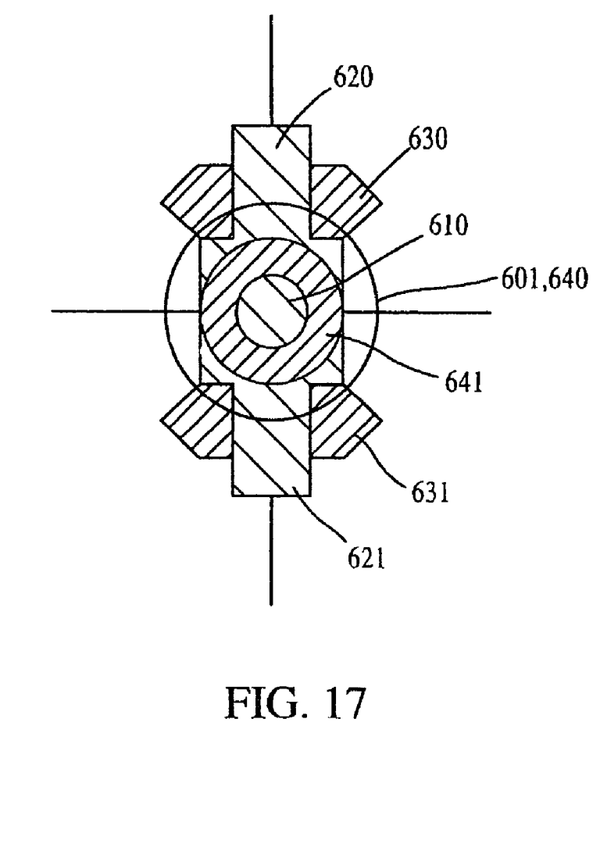
FIG. 17 presents a cutaway end view of the variation of FIG. 16.

FIGS. 16 and 17 show an implementation of the present invention via an arrangement of bevel gears. As shown in FIGS. 16 and 17, an input shaft 600 extending from, for example, a motor, has an attached first bevel gear 601. The input shaft 600 sleevably receives a output shaft 610, which has an attached first extension 620 and second extension 621. A second bevel gear 630 rotates about first extension 620, and a third bevel gear 631 rotates about second extension 621. Second bevel gear 630 and third bevel gear 631 each meshably engage first bevel gear 601.

Second bevel gear 630 and third bevel gear 631 each also meshably engage fourth bevel gear 640, which sleeves output shaft 610. Fourth bevel gear 640 further includes attached control sleeve shaft 641. Rotation of the fourth bevel gear 640 may be controlled, for example, via a fifth gear attached to the control sleeve shaft 641, using a control rod and sixth gear, similarly to as described with regard to FIGS. 3-5.

In operation, rotation of first bevel gear 601 via rotation of input shaft 600 produces rotation of second bevel gear 620 and third bevel gear 631. If fourth bevel gear 640 is free to rotate, rotation of fourth bevel gear 640 allows second bevel gear 630 and third bevel gear 631 to rotate, producing no motion of extensions 620, 621, and therefore no rotational motion of output shaft 610. If sleeve shaft 641 is held, second bevel gear 630 and third bevel gear 631 travel about fourth bevel gear 640, producing rotational motion of output shaft 610 via extensions 620, 621. If sleeve shaft 641 is retarded in rotational motion, retarded rotation of fourth bevel gear 640 produces retarded rotational motion of second bevel gear 630 and third bevel gear 631, resulting in retarded rotation of output shaft 610 via extensions 620, 621.

Second Variation of Fourth Implementation

Figure 18:
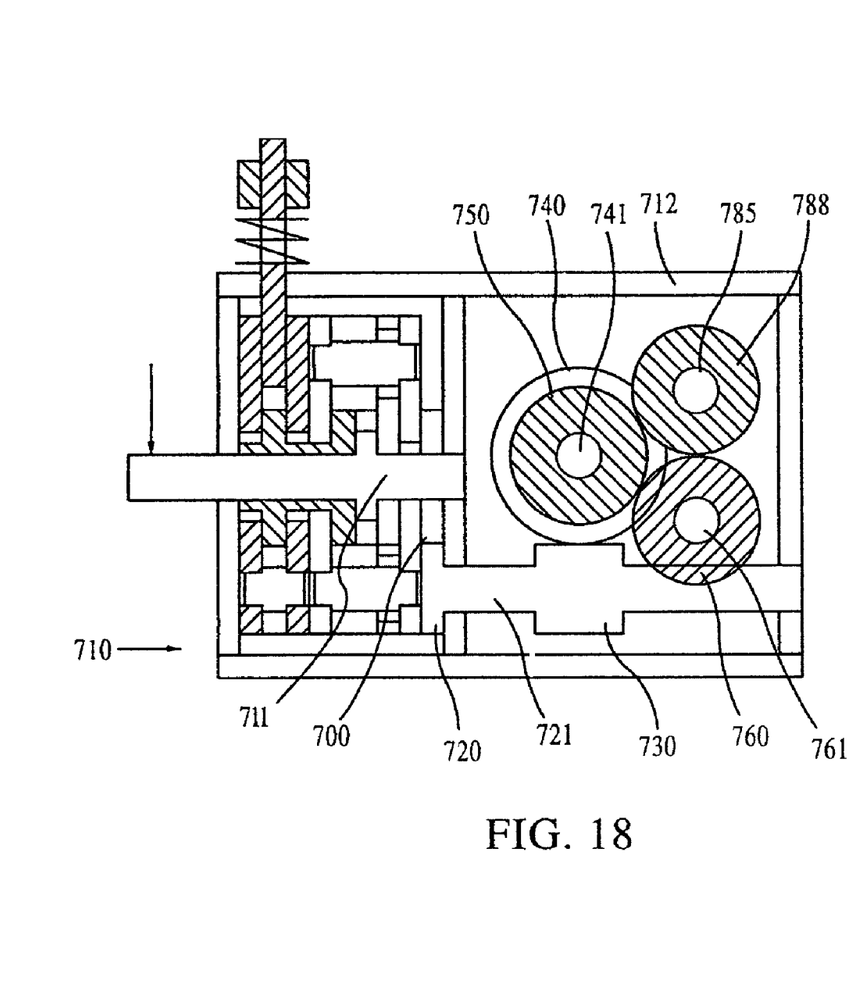
FIG. 18 and FIG. 19 show a cross-sectional and end views, respectively, of a second variation of the fourth implementation of the infinitely variable motion control device of the present invention.
Figure 19:
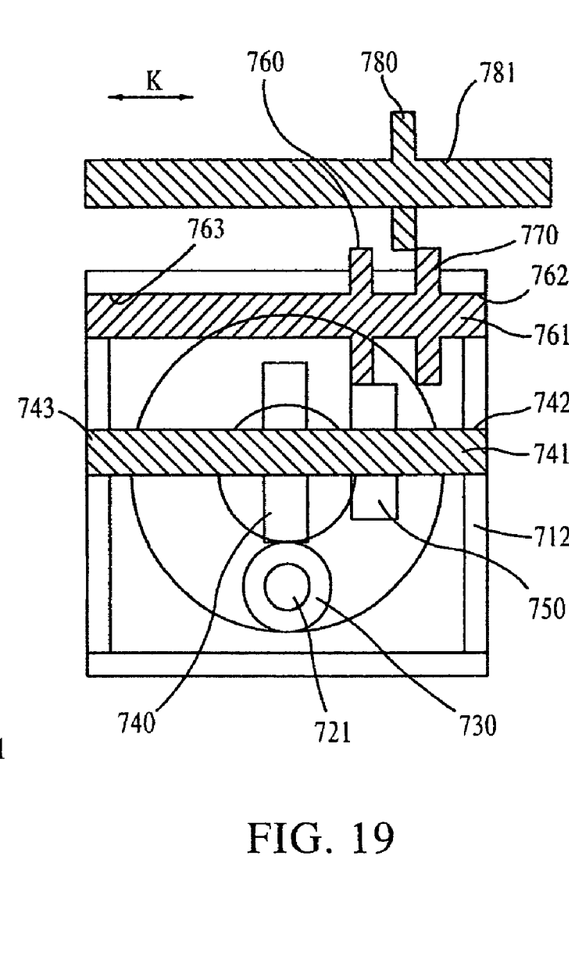

FIG. 18 and representative FIG. 19 show a cross-sectional and end views, respectively, of a second variation of the fourth implementation of the infinitely variable motion control device of the present invention using a planetary gear type arrangement, in which spur gears of a single diameter are used, the second variation of the fourth implementation including both the speed control input and other features of FIGS. 3-5, and added features for allowing reversal of direction of the output rotation. Each of the features of the device of FIGS. 18 and 19 is similar in design and function to the corresponding features of the second implementation, shown in FIGS. 3-5, except for the addition of an output sleeve shaft gear, seventh gear 700, having exterior teeth, extending from first portion output sleeve shaft 711, and inclusion of worm gear output portion 710 within extended housing 712, so as to accommodate engine braking and direction reversing elements. Other than inclusion of the seventh gear 700, output sleeve shaft 711 is similar in design and function to the output sleeve shaft 136 shown in FIG. 5.

As shown in FIGS. 18 and 19, external teeth of seventh gear 700 meshably engage external teeth of shaft gear, eighth gear 720. Eighth gear 720 is attached via shaft 721 to worm gear 730 having worm gear teeth. Teeth of worm gear 730, in turn, engage external teeth of orthogonal gear, ninth gear 740. Ninth gear 740 extends from and rotates about orthogonal shaft 741, which is able to slidably rotate, for example, within openings 742, 743 of housing 712. Also extending from shaft 741 is a second orthogonal shaft gear, tenth gear 750 having external teeth, so as to accommodate direction reversing elements.

First reversing shaft gear, eleventh gear 760, having external teeth, extends from and rotates about reversing shaft 761, which is able to slidably rotate, for example, within openings 762, 763 of housing 712. External teeth of eleventh gear 760 meshably engage external teeth of tenth gear 750. Also extending from reversing shaft 761 is second reversing shaft gear, twelfth gear 770, having external teeth.

Relocatable output shaft gear, thirteenth gear 780, having external teeth, extends from and rotates about output shaft 781. The thirteenth gear 780 is able to be slidably moved along axial direction K, for example, via sliding of shaft 781 within openings in housing 712, with thirteenth gear 780 thereby being located so as allow external teeth of thirteenth gear 780 selectably to engage meshably with external teeth of either twelfth gear 770 or tenth gear 750.

In operation, rotation (in a first rotational direction) of output sleeve shaft is transmitted via seventh gear 700 to eighth gear 720 (which rotates in second rotational direction, opposite first rotational direction). Rotation (in second rotational direction) of eighth gear 720 is transmitted to worm gear 730, which in turn causes rotation of ninth gear 740 (in first orthogonal rotational direction). Rotation of ninth gear (in first orthogonal rotational direction) produced rotation of tenth gear 750 (in first orthogonal rotational direction). Rotation (in first orthogonal rotational direction) of tenth gear 750 produces rotation of eleventh gear 760 and twelfth gear 770 (each in second orthogonal rotational direction, opposite to first orthogonal rotational direction).

Engagement of thirteenth gear 780 with twelfth gear 770 produces rotational motion of thirteenth gear (in first orthogonal rotational direction), and hence rotation of output shaft 781 (in first orthogonal rotational direction). Engagement of thirteenth gear 780 with tenth gear 750 produces rotational motion of thirteenth gear (in second orthogonal rotational direction), and hence reversed rotation of output shaft 781 (in second orthogonal rotational direction). Selective engagement of thirteenth gear 780 with either twelfth gear 770 or tenth gear 750 may occur, for example, while the output sleeve shaft 700 is at rest, as occurs in the first operational mode, as described above with regard to FIGS. 3-5.

Implementation with Two Bevel Gear Components

Figure 20:
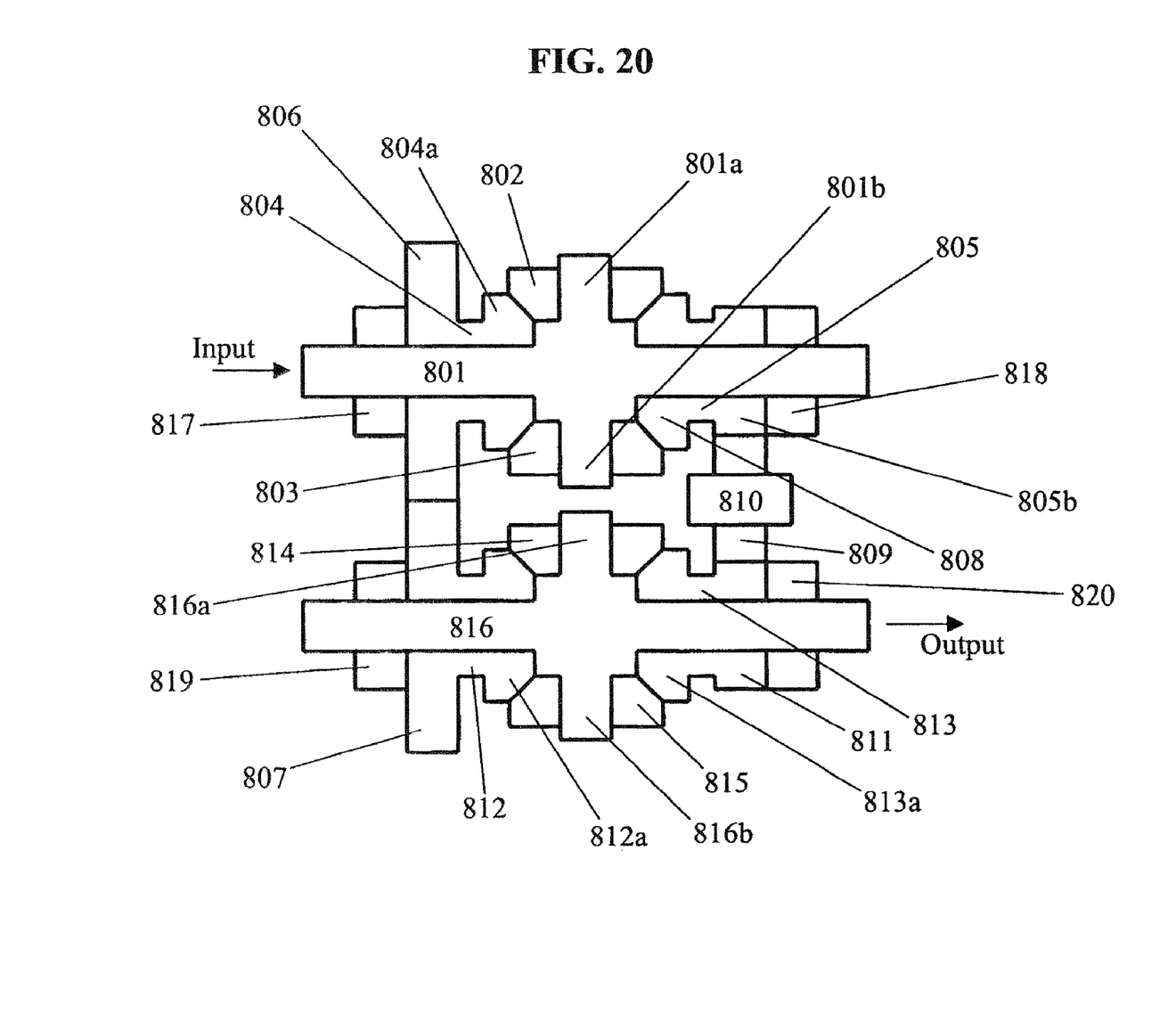
FIG. 20 shows a view of another embodiment of the present invention that includes various bevel and spur gears.

FIG. 20 presents a cross-sectional view of a variable output motion control device in accordance with yet another embodiment of the present invention. As shown in FIG. 20, an input shaft 801 has one or more extensions 801a, 801b, upon which first and second input shaft bevel gears 802, 803 turn. Bevel gears 802, 803, in turn, meshably engage first sleeve shaft 804 via first sleeve shaft bevel gear 804a. First sleeve shaft 804, which sleevably receives input shaft first end, also has attached first sleeve shaft gear (e.g., spur gear) 806. Coupled to sleeve shaft 804 is a first brake mechanism 817, which allows variable retardation or stopping of rotational motion of the first sleeve shaft 804. For example, first brake mechanism 817 may be connected to or include a control mechanism, such as a control rod and meshing gears, similar to control rod 50 and meshing gears 35, 36 and 44, 45, as described with regard to FIGS. 1 and 2.

Bevel gears 802, 803, also, in turn, meshably engage second sleeve shaft 805 via second sleeve shaft bevel gear 805a. Second sleeve shaft 805, which sleevably receives input shaft second end, also has attached second sleeve gear (e.g., spur gear) 808. Coupled to second sleeve shaft 805 is a second brake mechanism 818, which allows variable retardation or stopping of rotational motion of the second sleeve shaft 805. For example, second brake mechanism 818 may be connected to or include a control mechanism, such as a control rod and meshing gears, similar to control rod 50 and meshing gears 35, 36 and 44, 45, as described with regard to FIGS. 1 and 2.

First sleeve shaft gear 806 meshably engages third sleeve gear 807, which is connected to third sleeve shaft 812. Third sleeve shaft 812 has third sleeve shaft bevel gear 812a connected at one end. Third sleeve shaft 812 is sleevably received on a first end of output shaft 816. Sleevably received on the first end of output shaft 816 is a first one-way clutch mechanism 819, which, when fixably held, allows rotational motion of the output shaft 816 in only one direction. For example, the first one-way clutch mechanism 819 may be connected to or include a control mechanism, such as a control rod and meshing gears, similar to control rod 50 and meshing gears 35, 36 and 44, 45, as described with regard to FIGS. 1 and 2.

The output shaft 816 has one or more extensions 816a, 816b, upon which first and second bevel gears for output shaft 814, 815 turn. Bevel gears 814, 815 meshably engage fourth sleeve shaft bevel gear 813a, which is connected to fourth sleeve shaft 813. Fourth sleeve shaft 813, is sleevably received on a second, output end of the output shaft 816. Fourth sleeve shaft 813 also includes attached fourth sleeve gear (e.g., spur gear) 811. Sleevably received on the second, output end of output shaft 816 is a second one-way clutch mechanism 820, which, when fixably held, allows rotational motion of the output shaft 816 in only one direction. For example, the second one-way clutch mechanism 820 may be connected to or include a control mechanism, such as a control rod and meshing gears, similar to control rod 50 and meshing gears 35, 36 and 44, 45, as described with regard to FIGS. 1 and 2.

Second sleeve gear 808 meshably engages intermediate gear 809, which, in turn, meshably engages fourth sleeve gear 811. Intermediate gear 809 rotates about axle 810.

In operation in a first mode, if no input is received and first brake mechanism 817, second brake mechanism 818, first one-way clutch mechanism 819, and second one-way clutch mechanism 820 are not engaged, output shaft 816 is free to rotate, with revolution of output shaft extensions 816a, 816b producing rotation of first and second bevel gears for output shaft 814, 815, which in turn travel about third sleeve shaft bevel gear 812a and fourth sleeve shaft bevel gear 813a.

In operation in a second mode, if input is received and first brake mechanism 817, second brake mechanism 818, first one-way clutch mechanism 819, and second one-way clutch mechanism 820 are not engaged, input shaft 801 rotates, with revolution of input shaft extensions 801a, 801b producing rotation of first and second bevel gears for input shaft 802, 803, which in turn travel about first sleeve shaft bevel gear 804a and second sleeve shaft bevel gear 805a. Output shaft 816 is free to rotate, with revolution of output shaft extensions 816a, 816b producing rotation of first and second bevel gears for output shaft 814, 815, which in turn travel about third sleeve shaft bevel gear 812a and fourth sleeve shaft bevel gear 813a.

In operation in a third mode, if input is received, first brake mechanism 817, second brake mechanism 818, and second one-way clutch mechanism 820 are not engaged, but first one-way clutch mechanism 819 is engaged, input shaft 801 rotates, with revolution of input shaft extensions 801a, 801b producing rotation of first and second bevel gears for input shaft 802, 803, which in turn travel about first sleeve shaft bevel gear 804a and second sleeve shaft bevel gear 805a. Output shaft 816 is free to rotate in only a first direction, with corresponding revolution of output shaft extensions 816a, 816b producing rotation of first and second bevel gears for output shaft 814, 815, which in turn travel about third sleeve shaft bevel gear 812a and fourth sleeve shaft bevel gear 813a. One-way clutch mechanism 819 allows rotation of output shaft 816 in only one direction.

In operation in a fourth mode, if input is received, second brake mechanism 818, and second one-way clutch mechanism 820 are not engaged, but first brake mechanism 817 and first one-way clutch mechanism 819 are engaged, input shaft 801 rotates, with revolution of input shaft extensions 801a, 801b producing rotation of first and second bevel gears for input shaft 802, 803, which in turn travel about fixed first sleeve shaft bevel gear 804a. Travel of first and second bevel gears for input shaft 802, 803 produces rotation in second sleeve shaft bevel gear 805a and second sleeve shaft gear 808 in a first direction, second sleeve shaft gear 808 in turn producing rotation of intermediate gear 809 in the reverse direction from the first direction. Reverse rotation of intermediate gear 809 produces rotation in the first direction of fourth sleeve gear 811. Rotation of fourth sleeve gear 811, in turn produces rotation of fourth sleeve shaft bevel gear 813a in the first direction, which causes rotation of first and second bevel gears for output shaft 814, 815. Rotation of first and second bevel gears for output shaft 814, 815, in turn causes travel of first and second bevel gears for output shaft 814, 815 about fixed third sleeve shaft bevel gear 812a and thereby rotation of output shaft 816. One-way clutch mechanism 819 allows rotation of output shaft 816 in only one direction.

In the fourth mode, if first brake mechanism 817 is only partially applied (i.e., not used to fixably hold first sleeve shaft 804), first sleeve shaft bevel gear 804a rotates, producing rotation of first sleeve shaft gear 806 in the reverse direction of the first direction, and thus rotation in the first direction of third sleeve shaft gear 807. Rotation of third sleeve shaft gear 807 in the first direction, combined with reduced rotation of fourth sleeve shaft 813 in the first direction, produced as a result of reduced rotation of second sleeve shaft 805, thereby results in reduced rotation of output shaft 816, relative to the fourth mode with first brake mechanism 817 fully applied.

In operation in a fifth mode, if input is received, first brake mechanism 817 and first one-way clutch mechanism 819 are not engaged, but second brake mechanism 818, and second one-way clutch mechanism 820 are engaged, input shaft 801 rotates, with revolution of input shaft extensions 801a, 801b producing rotation of first and second bevel gears for input shaft 802, 803, which in turn travel about fixed second sleeve shaft bevel gear 805a. Travel of first and second bevel gears for input shaft 802, 803 produces rotation in first sleeve shaft bevel gear 804a in a first direction, in turn producing rotation in the reverse direction from the first direction of third sleeve gear 807, via rotation of first sleeve gear 806. Reverse rotation of third sleeve gear 807, in turn produces rotation of third sleeve shaft bevel gear 812a in the reverse direction, which causes rotation of first and second bevel gears for output shaft 814, 815. Rotation of first and second bevel gears for output shaft 814, 815, in turn causes travel of first and second bevel gears for output shaft 814, 815 about fixed fourth sleeve shaft bevel gear 813a and thereby rotation of output shaft 816. One-way clutch mechanism 820 allows rotation of output shaft 816 in only one direction.

In the fifth mode, if second brake mechanism 818 is only partially applied (i.e., not used to fixably hold second sleeve shaft 805), second sleeve shaft bevel gear 805a rotates, producing rotation of second sleeve shaft gear 808 in the reverse direction of the first direction, and thus rotation in the first direction of intermediate gear 809, and rotation in the first direction of fourth sleeve shaft gear 811. Rotation of fourth sleeve shaft gear 811 in the first direction, combined with reduced rotation of third sleeve shaft 807 in the first direction, produced as a result of reduced rotation of first sleeve shaft 804, thereby results in reduced rotation of output shaft 816, relative to the fifth mode with second brake mechanism 818 fully applied.

Although the implementation shown in FIG. 20 uses bevel gears 802, 803, 804a, 805a, 814, 815, 812a, and 813a, this embodiment may also be produced using appropriate spur gear arrangements. In addition, while orientation of the input and output shafts of FIG. 20 show these shafts to be generally parallel, the shafts may be arranged in series to operate similarly to as shown, using, for example appropriate connecting gears.

General Overview of Operation

Brake mechanisms may broadly be viewed as a passive driving force. A passive driving force does not operate a direct force, for example, that drives the system, but instead operates somewhat as a braking force, application of which causes operation of one branch of a system to be decreased, for the purpose of increasing the force operating in another branch. The use of such a passive driving force thus may be referred to as serving to redistribute force within system containing a given amount of power. Theoretically, the entire given amount of power in a system is useable, except for energy lost due to friction.

A well understood example of such a passive driving force can be found in the function of a typical vehicle differential. In a vehicle, a transmission output drives the bracket of a bevel gear assembly, referred to as a differential. As a vehicle turns, the wheel coupled to the differential that is on the inner arc of the turn must decrease in speed (revolutions per minute or rpm) relative to the wheel that is on the outer arc of the turn. The differential allows this variation in speed between the coupled wheels, thereby making the turn easier and smoother. In this example, the input speed from the transmission output is an independent variable and the outputs to the wheels are the dependent variables. In actual operation, however, the wheel making the smaller arc also experiences additional frictional force from the pavement, and the larger arc wheel experiences lesser frictional force. These forces act inversely to one another, similarly to the previous embodiments relating to the third and fourth implements, above. This frictional force acts as a second input to the system. Therefore, in reality, differentials are acted upon by two independent variables, one being the internally generated force from the transmission and the other externally exerted by friction. The external force does not drive the system, but slows down one wheel, allowing the other wheel to increase in speed. The external force is in this example may be referred to as a passive driving force.

Infinitely variable transmissions (IVTs) designed in accordance with this embodiment of the present invention, which comprise component sections that each contain three variable controls (TVCs), incorporate passive drivers operating under the same principles as differentials. When a vehicle is cruising in a straight line, no passive driving force is applied, and both wheels rotate at the same speed. When the vehicle makes a sharp turn, the passive driving force is high, and the outer wheel turns faster. Lesser sharp turn produce less passive force and less resultant speed at the outer wheel.

IVTs equipped with TVCs and incorporating passive drivers operate similarly to differentials, except that IVTs have two independent variables, one input is from the engine and the other is provided by the controls. The two independent inputs for the second TVC for an IVT rotating in opposite directions, resulting in zero output through the bracket of the TVC. As the passive drivers are activated, the amount of activated force operates similarly to the wheel for a differential making a smaller arc, and the resultant output increases similarly to that of the wheel making the larger arc.

There are many mechanisms for producing variable passive driving forces for use with this embodiment. Such mechanisms include belts and pulleys with tension control, chains and sprockets with tension control, gears with center-to-center compression control, thrust bearings with thrust variation, electro-magnetic controls, and hydraulic flow controls.

Each of these mechanisms is able to create intermittent torque and speed in the variable output motion control device. The tension control of belts and chains, for example, can be used for this purpose by adding tension adjusting idlers. The compression control of two gears can be used by adjusting the center-to-center distance between the shafts for the gears. To minimize the shaft wear, bearings or bushings can be used. Thrust bearings are designed to overcome generated thrust, and use of variable thrust allows control of torque and speed. Electro-magnetic control operates in a similar manner motorized control, except electro-magnetic control generates a braking force, rather than a driving force. This braking force, in practice, is more effective than a driving force. Hydraulic control is also a passive driving force. The flow rate in a hydraulic control is typically controlled using valves. With use of valves operating to restrain flow, the response of the system is faster. In certain cases, pumps may be eliminated when using hydraulic control with the present invention by controlling the flow rate of fluid from a main reservoir.

Example embodiments of the present invention have now been described in accordance with the above advantages. It will be appreciated that these examples are merely illustrative of the invention. Many variations and modifications will be apparent to those skilled in the art.

The invention claimed is:

1. A variable motion control device, comprising:
   an input shaft having an input end and an output end;
   an output sleeve shaft having an attached unit intermediate said input end and said output end, wherein the output sleeve shaft has an opening for sleevably receiving the output end of the input shaft;
   a first input shaft gear attached to the input shaft;
   a second gear coupled to the intermediate unit, the second gear being meshably engaged with the first input shaft gear;
   a third gear coupled to the output sleeve shaft, the third gear being meshably engaged with the second gear;
   a fourth gear coupled to the intermediate unit;
   a control mechanism having a control mechanism gear attached to a sleeve unit including said fourth gear, said third gear meshably engaged with the fourth gear, wherein the control mechanism provides for variable control of the fourth gear via the control mechanism gear;
   wherein variation of the control mechanism varies motion of the fourth gear, thereby varying output of the output sleeve shaft.

2. The device of claim 1, wherein the intermediate unit comprises an axle.

3. The device of claim 2, wherein the intermediate unit comprises a second axle.

4. The device of claim 1, wherein the intermediate unit comprises a hub.

5. The device of claim 1, the device having a housing for said first input shaft gear and said second, third and fourth gears and said control mechanism gear, wherein the control mechanism includes a control rod slidably mounted to said housing.

6. The device of claim 5, wherein the control mechanism includes a tensioning mechanism coupled to the control rod, the tensioning mechanism for varying a binding tension between the fourth gear and the control mechanism gear.

7. A variable motion control device, comprising:
   an input shaft having an input end and an output end;
   an output sleeve shaft coupled to a motion communication means, the output sleeve shaft having an opening for sleevably receiving the output end of the input shaft;
   a first input shaft gear attached to the input shaft;
   a second gear coupled to the motion communication means, the second gear being meshably engaged with the first input shaft gear;
   a third gear coupled to the output sleeve shaft, the third gear being meshably engaged with the second gear;
   a fourth gear coupled to the motion communications means;
   a control means coupled to the fourth gear, wherein the control means provides for variable control of motion of the fourth gear via a second sleeve unit including said fourth gear and a fifth gear;
   wherein variation of the control means variably controls motion of the fourth gear, thereby varying output of the output sleeve shaft.

8. The device of claim 7, wherein the motion control means comprises a hub.

9. The device of claim 7, wherein the motion control means comprises an axle.

10. The device of claim 9, wherein the motion control means comprises a second axle.

11. The device of claim 7 having a housing for said first input shaft gear and said second, third and fourth gears, wherein said control means comprises a control rod slidably mounted to the housing.

12. The device of claim 7 having a housing for said first input shaft gear and said second, third and fourth gears, wherein said control means comprises first and second control rods slidably mounted to the housing.

13. The device of claim 7, wherein the control means includes a tensioning mechanism coupled to a control rod, the tensioning mechanism for varying a binding tension between the fifth gear and a sixth gear.

14. A method for providing a variable output from a variable input using a control, the method including:
    receiving an input motion to an input shaft;
    transmitting the input motion via a first gear to a second gear meshably engaged with the first gear;
    transmitting the motion of the second gear to an intermediate unit, the intermediate unit comprising a hub and axle For mounting said second gear and being intermediate an input end and an output end of said input shaft, the intermediate unit being attached to an output sleeve shaft; and
    variably applying an arresting force to the intermediate unit, variable application of the arresting force varying output of the output sleeve shaft.

15. The method of claim 14 wherein said second gear motion transmitting comprises said second gear engaging a third gear coupled to said output sleeve shaft.

* * * * *